June 20, 1939.  M. F. PHELPS  2,162,968
V-BELT SHIFTING MEANS FOR CONE PULLEYS
Filed Dec. 15, 1938  2 Sheets-Sheet 1
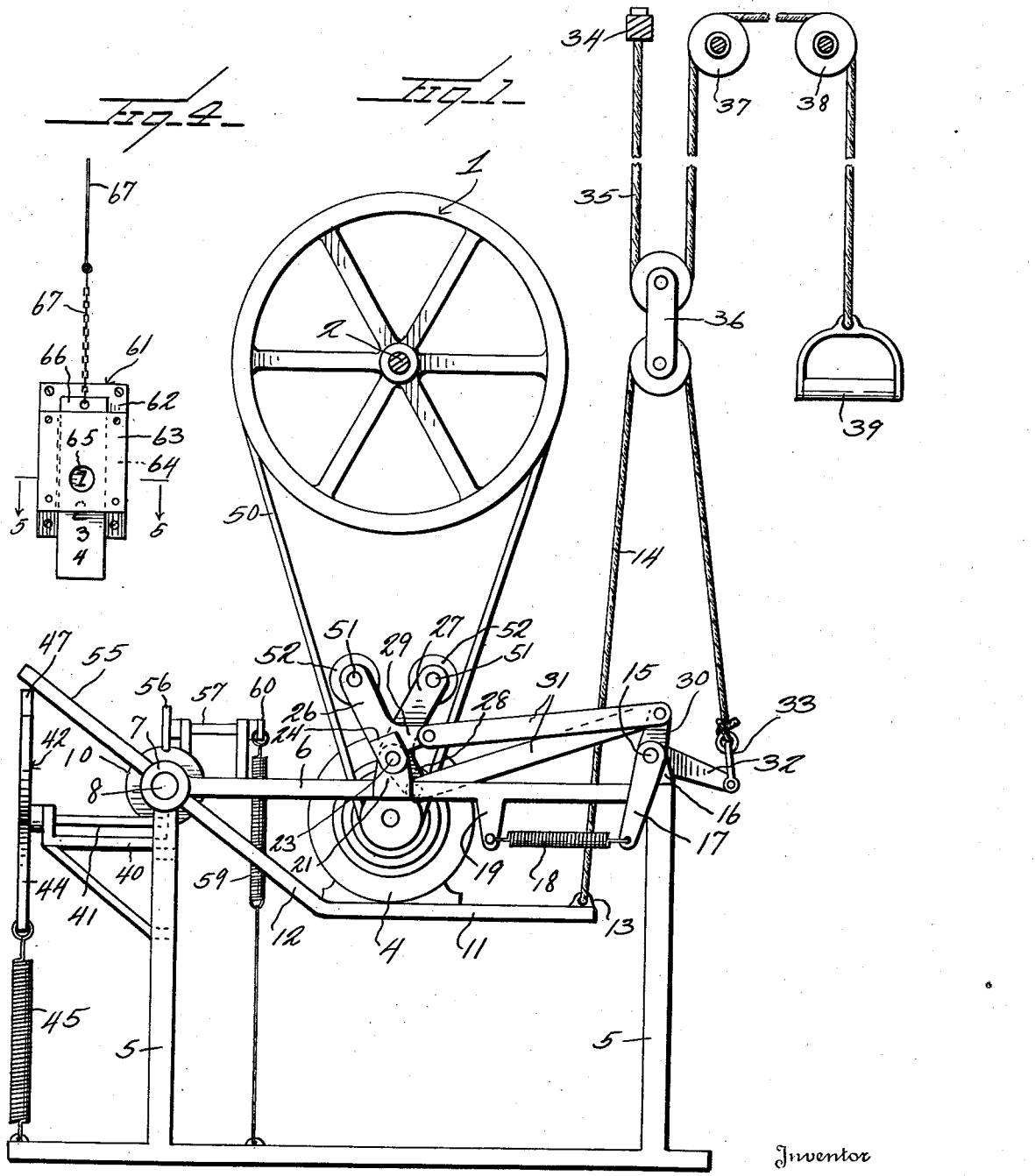
Inventor
M. F. Phelps
By Watson E. Coleman
Attorney June 20, 1939. M. F. PHELPS 2,162,968
V-BELT SHIFTING MEANS FOR CONE PULLEYS
Filed Dec. 15, 1938 2 Sheets-Sheet 2
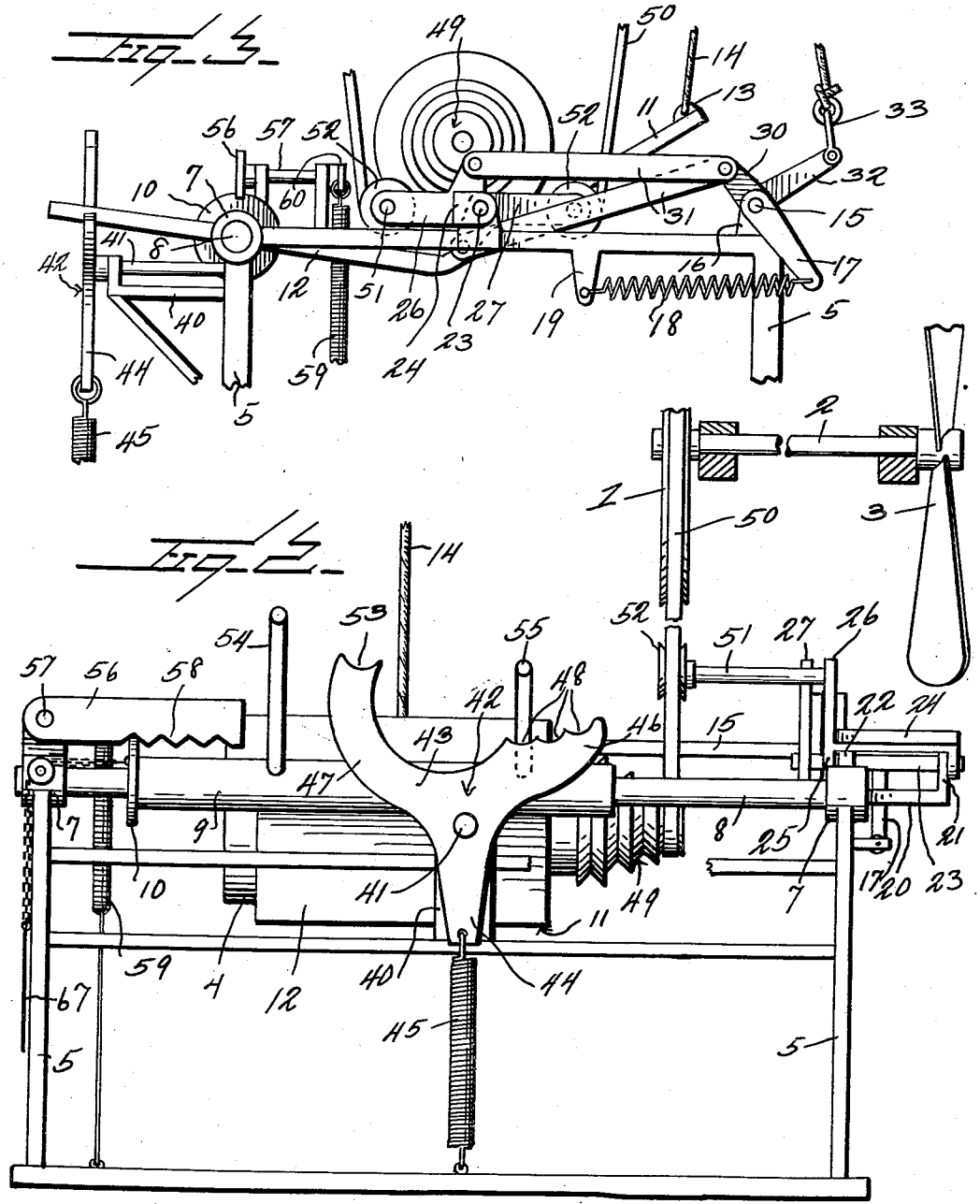
Inventor
M. F. Phelps
By Watson E. Coleman
Attorney Patented June 20, 1939

2,162,968

UNITED STATES PATENT OFFICE 2,162,968

V-BELT SHIFTING MEANS FOR CONE PULLEYS

Morton F. Phelps, Little Rock, Ark.

Application December 15, 1938, Serial No. 245,969

14 Claims. (Cl. 74—242.4)

This invention relates to belt shifting devices and pertains particularly to a device for shifting a belt on a V-belt cone pulley.

The primary object of the present invention is to provide an improved belt shifting mechanism wherein a V-belt may be easily and quickly shifted to any one of a number of selected positions upon a V-belt cone pulley without necessitating the stopping or slowing up of the pulley operation.

Another object of the invention is to provide mechanism by which a V-belt may be shifted upon a V-belt cone pulley from a point remote from the pulley and wherein the mechanism also operates as an automatic belt tightener.

A further object of the invention is to provide in a device of the character described, a novel means for spreading and holding the portion of the belt contacting the V-belt cone pulley whereby such portion is maintained in proper position so that it will accurately engage the selected portion of the cone pulley after the shift has been made.

A still further object of the invention is to provide in a mechanism of the above described character, a novel means for shifting the V-belt cone pulley with respect to the belt and for spreading and holding the belt in contact with rotary spreader members so that the movement of the belt will not have to be stopped while the shifting of the pulley is being effected.

Other objects and advantages of the invention will become apparent as the description proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the mechanism embodying the present invention, the belt being shown operatively coupled between a driven pulley and a driving pulley.

Fig. 2 is a view of the mechanism shown in Fig. 1 from the rear of the same.

Fig. 3 is a view in side elevation similar to Fig. 1, but showing the belt spreader in operation and the V-belt cone pulley lifted from the belt.

Fig. 4 is a view in elevation of an indicator employed for designating the speed at which the cone pulley is set to operate.

Fig. 5 is a sectional view on an enlarged scale taken on the line 5—5 of Fig. 4.

Referring now more particularly to the drawings, the numeral 1 generally designates a driven pulley wheel which may be connected with any suitable driven unit or machine through the medium of the shaft 2 upon which it is supported. There is here shown upon the shaft 2, in Fig. 2, a fan 3, as the present mechanism was designed primarily for use in connection with blower systems wherein the blower or fan is operated by an electric motor such as is indicated at 4, which is disposed adjacent to the driven pulley 1, but it is to be understood that the mechanism embodying this invention is not to be confined to the use here shown and described.

In carrying out the present invention, there is provided a supporting frame structure consisting of suitable standards or legs 5 between which are connected side bars or rails 6 and at one side of the supporting structure the legs or standards are provided with sleeves 7 in which is supported a shaft 8. This shaft in the present illustrated form of the invention is shown as extending across the rear of the supporting frame and it carries the elongated sleeve 9 which is slidable and also rotatable thereon. One end of this sleeve 9 carries the flange or collar 10, the use of which will be hereinafter described.

The numeral 11 designates a platform upon which the motor 4 is mounted, this platform being located in the central portion of the supporting structure and having the upwardly and rearwardly extending rear portion 12 which is joined to the sleeve 9 so that when the platform is raised and lowered, it will rock the sleeve and will turn about the shaft 8 as a center.

At the forward edge of the platform is an ear 13 or other suitable means for attachment thereto of one end of a cable or rope 14.

Extending across the front of the supporting structure between the front legs 5 is a shaft 15, this shaft connecting extended upper end portions 16 of the front legs 5, as shown in Figs. 1 and 3. At one end and upon the outer side of the adjacent leg 5, the shaft 15 carries the downwardly and rearwardly extended arm 17, the lower end of which is attached to one end of the contractile spring 18, the other end of which is secured to a fixed ear 19 extending downwardly from the adjacent side rail 6. Rearwardly of the arm 17 there is secured to the adjacent side rail 6 the outwardly extending bracket 20 terminating in the upwardly extending portion 21 and the adjacent rail 6 is provided with a suitable bearing ear 22 which is in opposed relation with the upturned end 21 of the bracket and provides with the end 21 supporting means for the short shaft 23 which extends perpendicularly to the adjacent rail 6.

Extending longitudinally of and above the shaft 23 is the elongated frame 24 which has at its ends the downturned ears 25 which are connected with the shaft 23, so that the frame may rock on this shaft and at the inner end of this shaft is an upwardly extending arm 26. Also mounted upon the inner end of the shaft 23 inwardly of the arm 26, is a corresponding arm 27, the lower end of which is extended to form the oblique downwardly projecting ear 28. These arms 26 and 27 have coordinate operation in connection with the actuation of the mechanism and they normally extend upwardly in divergent relation, as shown in Fig. 1, and are adapted to be swung apart and downwardly for the purpose of spreading the belt as hereinafter described.

The lower end portion of the frame carried arm 26 has a right angularly extending ear 29 which corresponds with the downwardly and forwardly extending ear 28 of the arm 27. Thus it will be seen that these ears, both of which extend toward the front of the machine, are also in divergent relation.

Secured to the shaft 15 to be rocked therewith is a link ear 30 which extends upwardly and has its upper end pivotally attached to the ends of links 31, one of which is pivotally attached at its other end to the rock arm ear 29 while the other one is pivotally attached at its other end to the rock arm ear 28.

There is also secured to the shaft 15 the forwardly and downwardly extending actuating arm 32, at the outer end of which is a suitable link 33 for the connection therewith of the other end of the cable 14.

Disposed above the shaft 15 is a suitable fixed member 34 to which may be attached one end of a primary operating cable 35. A double pulley unit 36 joins the cables 14 and 35 in the manner shown, the cable 14 passing over one of the pulleys which is disposed at a substantial elevation above the shaft 15 while the cable 35 passes around and under the other pulley of this unit and then passes upwardly to the overlying pulleys 37 and 38 and downwardly to a control handle 39 which may be located at a point remote from the shifting mechanism.

At the rear of the supporting frame structure there is secured a suitable fixed bracket 40 for the support of a rock shaft 41, which is horizontally disposed and extends rearwardly of the shaft 8 and is in perpendicular relation therewith. This shaft 41 at its rear end carries a shifter unit which is generally designated by the numeral 42 and which comprises a plate 43 to which the shaft is secured and which has a depending tail portion 44 which is connected by the contractile spring 45 with a fixed underlying portion of the frame structure or with any other suitable fixed unit. The plate 43 is provided with the horns 46 and 47. One horn, the horn 46, is formed upon its top edge to provide a series of notches or recesses 48. These recesses are arranged on a slightly curved concave line and are adjacent the end of the shaft motor 4 on which is carried the V-belt cone pulley which is indicated generally by the numeral 49 and which cone pulley is connected by a V-belt 50 with the pulley 1.

The upper ends of the belt spreader arms 26—27 carry the inwardly extending shafts 51 and each of these shafts supports an idler V-pulley 52 which is disposed normally in close proximity to but free of contact with the inner side of one run of the belt 50. Both pulleys 52 are, therefore, normally in the same plane transversely of the machine and within the area defined by the belt 50 and adjacent the lower end of the belt so that when the arms are oscillated or spread apart they will contact with the two sides of the belt and tend to force them apart also as hereinafter described.

The other horn of the plate 43 has a single notch 53 which is directed upwardly as shown, and which is at an elevation greater than the notches 48.

The sliding sleeve 9 which is joined with the motor supporting platform carries the two upwardly and rearwardly directed arms 54 and 55. These arms are spaced apart a distance which is substantially equal to the distance between the extreme sides of the horns 46 and 47, so that when the arm 54 is shifted to the position where it may be brought, upon oscillation of the sleeve 9, into the notch 53, the arm 55 will be beyond the horn 46. When the belt 50 is in engagement with the smallest end of the V-belt pulley 49, which pulley is provided with four V-grooves, as shown, the arm 55 will extend across the inner notch 48 of the shifting plate, but will, of course, be a substantial distance above the top edge of the plate as shown in Fig. 1. With the arm 55 in this position, the arm 54 will be disposed at a substantial distance beyond the outer edge or side of the horn 47, as shown in Fig. 2.

Pivotally supported upon the side of the mechanism supporting frame opposite from the belt spreader arms, is a latch bar 56 which is supported in any suitable manner, as for example, upon the shaft 57, to rock in a vertical plane with the shaft 8 so that the notched under edge portion 58 may be brought into contact with the edge of the sleeve flange 10. A suitable spring 59 is provided and connected at one end in a suitable manner, as through the medium of the arm 60 carried by the shaft 57, to normally urge the latch arm 56 to swing down so that the flange 10 will be engaged in one of the notches upon the under edge of the arm and any tendency of the sleeve 9 together with the motor and supporting platform, to creep or shift on the shaft 8, will be prevented.

In the operation of the present mechanism, when a pull is exerted upon the control handle 39, it will be seen that a lifting action will be exerted upon the double pulley unit 36 which will tend to pull up upon both the platform 11, on which the motor is supported, and the shifting mechanism actuating arm 32. The upward oscillation of this arm is opposed by the spring 18 and, therefore, approximately the same amount of lifting power will be transmitted to the platform as to the arm 32. This action may be controlled by providing a spring 18 of a weight proportionate to the weight of the motor on the platform. Thus as the pull upon the cable 14 tends to raise the platform 11 and the motor supported thereon, the simultaneous oscillation of the shaft 15 through the medium of the arm 32 will spread the belt spreader arms 26 and 27, so as to bring the idler pulleys 52 into contact with the adjacent sides of the belt and separate these sides or spread the belt in the manner shown in Fig. 3. Thus the spreading apart of the sides of the belt will raise the lowermost portion of the belt and pull up on the cone pulley 49 at the same time that the upward pull upon the platform 11 is obtained and this combined action will assist in lifting the motor and the platform. However, the continued lifting of the platform will eventually raise the motor to a height where the pulley will be lifted free of the belt as shown in Fig. 3. With the bringing of the motor into this position, the sleeve 9 will be rocked and the arm 55 will swing down into the underlying notch 48 of the shifter plate. This will cause the shifter plate to rock on the shaft 41 and will throw the notch over and downwardly as it follows the arcuate path concentric with the shaft 41 on which the plate turns. The throw of the notch 48 in which the arm 55 is engaged will effect a lateral movement of the arm and the sleeve 9 as well as the platform 11 and the motor and pulley supported thereon, so as to bring the next V-groove of the pulley into position above the spread-out or horizontal portion of the belt which is being held by the idler pulleys 52 and their supporting arms. Thus when the pull upon the cable 35 is released so as to let the platform return to its normal position, the V-pulley will drop into contact with the portion of the belt 50 lying between the pulleys 52 and will engage the next one of the grooves of the cone pulley.

With each repetition of the action above described, the cone pulley, together with the motor and its supporting platform and the arms 54 and 55, will be moved over one step or a distance equal to the distance between the centers of the V-grooves of the cone. When the last oscillation of the arm 55 is accomplished so as to shift the cone pulley into position where the belt will engage the innermost groove, the arm 54 will be brought into a position where, upon the return of the platform 11 to its normal horizontal position, it will be disposed above the notch 53 in the shifter plate horn 47. Due to the elevation of the notch 53 above the notches 48, and by other proper proportioning of the parts, when the pull handle 39 is again actuated, the arm 54 will swing down into the notch 53 and rock the plate 42 in a counterclockwise direction or opposite to the direction in which it had been previously rocked by the engagement of the arm 55 with the horn 46 thereof. When this counterclockwise rocking of the plate occurs, the arm 55 will swing down past the end of the horn 46, and a sufficient reverse throw will be given to the platform sleeve and arms to restore the parts to the original or starting position which would be the position in which they are illustrated in Fig. 2.

The under edges of the horns 46 and 47 are curved in such a manner that if the arms 54 and 55 come into contact with such edges as may possibly occur, when the last shift is made or when the return shift is made, they will ride up and push the plate or rock the plate out of the way so that the arms can come back to their proper upwardly and rearwardly directed positions.

In order that a determination may be readily made at a point remote from the shifter mechanism, of the speed at which the shifter is set to operate or, in other words, in which one of the grooves of the cone pulley the power transmitting belt 50 is engaged, there is provided the mechanism shown in Figs. 4 and 5, which is connected with the collar 10 of the sliding sleeve 9. This indicator shown in Fig. 5, is identified generally by the numeral 61 and may be located at some point where it may be conveniently observed by an operator at the control 39. As shown, the indicator consists of a back plate 62 which may be secured to a wall or other suitable support, having a slide covering plate 63 secured to the face thereof and maintained in spaced relation from the back plate by the separated guide strips 64. The cover plate 63 is provided with a window opening 65 and slidably disposed between the plates 62 and 63 and between the guides 64, is a vertically movable slide plate 66 which has upon its face numbers designating the number of grooves on the cone pulley or the number of speeds at which the mechanism may be set for the operation of the driven member 1 or other machine connected with the cone pulley.

The upper edge of the slide plate 66 is connected by a suitable flexible connection 67 with an end of the sleeve 9, so that as this sleeve is shifted, the flexible connection 67 will be pulled or released to effect the vertical movement of the plate 66. In the construction here shown, the end of the flexible connection 67 is joined to the flange 10, as shown in Fig. 2, and suitable guide pulleys may be provided between the point where the connection is joined to the flange 10 and the slide plate 66, so that the flexible connection 67 may be shifted smoothly.

Thus it will be seen that as the shifter plate 42 operates to move the sleeve 9 and the parts connected therewith, the connection 67 which is joined to the sleeve will be either pulled to raise the indicator plate 66 or will be slackened so that this indicator plate may slide down under its own weight and in each of the positions or stations for the cone pulley where the V-belt will be engaged in one of the four groooves thereof, a number will be exposed through the window 65 to show whether the connection between the cone pulley and the driven member 1 is for low speed, as it is here illustrated, or for an intermediate or a high speed.

From the foregoing, it will be readily apparent that there is here provided a novel means for shifting a V-belt and a V-belt cone pulley relatively so that various positions of engagement between the belt and cone pulley may be had and that such shifting action may be accomplished from a point remote from the mechanism and also that it may be accomplished without stopping the motor and without materially cutting down or reducing the rotary speed of the driven unit which the belt connects with the motor. It will also be seen that the same movement of the parts is made use of for shifting the motor and the cone pulley back to starting position as is used for shifting the cone pulley over for the purpose of connecting the belt therewith in the several steps.

While the drawings illustrate the use of a V-belt and a V-belt pulley and the foregoing description has been directed particularly to such form of belt and pulley, it is to be understood that the invention is not to be limited to this particular form of pulley or belt as it will be obvious that there may be employed a flat or round belt or a chain belt in association with any type of grooved or other form of pulley in association with which such other belts might be used.

It is also to be pointed out that the pivotal or oscillatable suspension of the motor supporting platform 11 adds to the invention a belt tightening feature as the weight of the said parts are to some extent imposed upon the belt and the driven unit with which it is connected.

What is claimed is:

1. Mechanism for changing the engagement of a belt with a belt cone pulley wherein the pulley is carried by a power unit and the belt connects with a driven unit, comprising a vertically oscillatable support for the power unit, means for effecting the raising of the support and the unit thereon, and mechanism which is so constructed and arranged that upon raising the support and unit the opposite sides of the belt between the cone pulley and the driven unit will be forced apart and said support and the unit carried thereby will be shifted a predetermined distance in a direction transversely of the belt.

2. Mechanism for changing the engagement of a belt with a belt cone pulley in which the pulley is carried upon a driving power unit and the belt connects the pulley with a rotary driven unit, comprising a vertically oscillatable support for said power unit, relatively oscillatable spreader members supported between opposite sides of the belt connecting the pulley with the driven unit, means for effecting the raising of the power unit support, means operating simultaneously with the raising of the support for separating said spreader means whereby the opposite sides of the belt will be engaged and forced apart, the said forcing apart of the opposite sides of the belt effecting a preliminary lifting action upon the pulley and power unit, and means engaged by the power unit supporting means upon the lifting of the same a predetermined distance for imparting a lateral shifting motion thereto whereby said pulley will be moved a predetermined distance across the adjacent portion of the belt.

3. Mechanism for changing the engagement of a belt with a belt cone pulley in which the pulley is carried upon a driving power unit and the belt connects the pulley with a rotary driven unit, comprising a power unit supporting platform, means supporting the platform whereby vertical oscillation may be given thereto and whereby the same may be shifted in a direction perpendicular to the vertical and to the plane in which the belt operates, a pair of upwardly divergently related arms oscillatably supported in the area defined by the belt between the cone pulley and the driven unit, pulleys carried by said arms each adapted for engagement with the inner side of the belt, means operable from a remote point for effecting vertical oscillation of the platform, means connecting said first means with said arms whereby the arms and the pulleys carried thereby may be spread apart simultaneously with the vertical swinging of the platform to effect the spreading of the belt, an oscillatable throw unit, and means connected with the platform for movement in a vertical plane with the vertical movement of the platform for engaging said oscillatable throw unit whereby said unit will effect the lateral shifting of the platform and the cone pulley relative to the belt.

4. In a mechanism of the character described, a motor unit having a shaft carrying a belt cone pulley, a driven pulley, a belt connecting the cone pulley with the driven pulley, a supporting platform for the motor unit, said platform being mounted for vertical oscillation and for shifting movement in a direction perpendicular to the plane of oscillation, a pair of pivotally supported idler pulley carrying arms disposed between the side runs of the belt, a rock shaft having link connection with said arms whereby turning of the shaft in one direction will effect the separation of the pulley carrying ends of the arms to bring the pulleys into contact with the adjacent runs of the belt for the spreading of the belt, means for effecting the rocking of said shaft in the said one direction, means for simultaneously lifting the motor unit support, and means which is actuated by and upon the vertical oscillation of the motor unit support for effecting the horizontal shifting of the support.

5. In mechanism of the character described, including a motor unit having a shaft supporting a belt cone pulley with which pulley is connected a driven pulley through the medium of a belt, means for effecting the shifting of the cone pulley relative to the belt comprising a vertically oscillatable support for the motor, means for effecting the raising of said support, means disposed within the area defined by the belt for engaging opposite sides of the belt and spreading the same simultaneously with the raising of the support and the motor and pulley carried thereby, said motor support being adapted for horizontal movement, and means for imparting a step by step horizontal shifting of the motor support with each vertical movement of the support from its normal position, comprising a notched plate pivotally supported for oscillation on an axis extending perpendicular to the horizontal movement of said support, resilient means normally holding said plate in one position, and an arm coupled with said support for vertical swinging movement into engagement with a notch of said plate whereby the plate will be oscillated to effect the shifting of the arm and the support horizontally.

6. In mechanism of the character described, including a motor unit having a shaft supporting a belt cone pulley with which pulley is connected a driven pulley through the medium of a belt, means for effecting the shifting of the cone pulley relative to the belt, comprising a vertically oscillatable support for the motor, means for effecting the raising of said support, means disposed within the area defined by the belt for engaging opposite sides of the belt and spreading the same simultaneously with the raising of the support and the motor and pulley carried thereby, said motor support being adapted for horizontal movement, means for imparting a step by step horizontal shifting of the motor support with each vertical movement of the support from its normal position, comprising a notched plate pivotally supported for oscillation on an axis extending perpendicular to the horizontal movement of said support, resilient means normally holding said plate in one position, an arm coupled with said support for vertical swinging movement into engagement with a notch of said plate whereby the plate will be oscillated to effect the shifting of the arm and the support horizontally, said plate having a notch therein upon the upper edge thereof upon the side of the pivot remote from the first-mentioned notches, and an arm carried by said motor support for engagement in said last-mentioned notch to effect the reverse oscillation of the plate and the return movement of the support to its original position after the support has reached the limit of its movement in the first stated direction.

7. In mechanism of the character described, a power unit including a shaft carrying a belt cone pulley which is connected with a driven pulley by a belt, supporting means for the power unit which may be vertically and horizontally shifted, means for effecting the vertical shifting of the power unit supporting means, means connected with and operated by said first means for separating the opposite sides of the belt upon the raising of the power unit and cone pulley whereby the belt will be held in the plane of the driven unit when the cone pulley is lifted free thereof, a rock member supported for oscillation on an axis perpendicular to the direction of horizontal movement for said supporting means, said rock unit including a horn extending laterally from its axis of oscillation, an arm carried by said supporting means and normally extending above said horn to be brought into contact therewith upon the vertical oscillation of the supporting means and to effect the rocking of the rock unit, said horn having its upper edge formed with a series of recesses in which the arm progressively engages with the raising and lowering of the supporting means.

8. In mechanism of the character described, a power unit including a shaft carrying a belt cone pulley which is connected with a driven pulley by a belt, supporting means for the power unit which may be vertically and horizontally shifted, means for effecting the vertical shifting of the power unit supporting means, means connected with and operated by said first means for separating the opposite sides of the belt upon the raising of the power unit and cone pulley whereby the belt will be held in the plane of the driven unit when the cone pulley is lifted free thereof, a rock member supported for oscillation on an axis perpendicular to the direction of horizontal movement for said supporting means, said rock unit including a horn extending laterally from its axis of oscillation, an arm carried by said supporting means and normally extending above said horn to be brought into contact therewith upon the vertical oscillation of the supporting means and to effect the rocking of the rock unit, said horn having its upper edge formed with a series of recesses in which the arm progressively engages with the raising and lowering of the supporting means, a second horn carried by said rocking unit upon the side of the pivotal center therefor opposite from the first horn, and a second arm carried by said supporting means and spaced from the first arm a distance whereby it will be brought into contact with the end of the second horn upon raising of the supporting means after the first arm has moved past the end of the first horn whereby to oppositely rock the rock means to reversely shift said supporting unit.

9. Mechanism for changing the engagement of a belt with a belt cone pulley wherein the pulley is carried and rotated by a power unit and the belt connects said pulley with a driven unit, comprising a supporting platform for the power unit, a horizontally disposed shaft, coupling means between the platform and the shaft facilitating vertical oscillation of the platform and horizontal movement of the same, means for effecting the vertical oscillation of the platform, spreader means operating against opposite sides of said belt for separating said sides simultaneously with the vertical oscillation of the platform, said spreader means being operated by the first-mentioned means, an oscillatable throw unit mounted upon a pivot disposed perpendicularly to the oscillation pivot for the platform, and means connected with the platform for engaging and oscillating said throw means upon the vertical oscillation of the platform whereby a lateral thrust will be imparted to the platform to effect its horizontal movement and corresponding horizontal movement of the cone pulley with respect to said belt.

10. Mechanism for changing the engagement of a belt with a belt cone pulley wherein the pulley is carried and rotated by a power unit and the belt connects said pulley with a driven unit, comprising a supporting platform for the power unit, a horizontally disposed shaft, coupling means between the platform and the shaft facilitating vertical oscillation of the platform and horizontal movement of the same, means for effecting the vertical oscillation of the platform, spreader means operating against opposite sides of said belt for separating said sides simultaneously with the vertical oscillation of the platform, said spreader means being operated by the first-mentioned means, an oscillatable throw unit mounted upon a pivot disposed perpendicularly to the oscillation pivot for the platform, means connected with the platform for engaging and oscillating said throw means upon the vertical oscillation of the platform whereby a lateral thrust will be imparted to the platform to effect its horizontal movement and corresponding horizontal movement of the cone pulley with respect to said belt, and means operated by and upon the shifting of the power unit supported platform for indicating the groove of said cone pulley engaged by the belt.

11. Mechanism for changing the engagement of a belt with a belt cone pulley wherein the pulley is carried and rotated by a power unit and the belt connects said pulley with a driven unit, comprising a supporting platform for the power unit, a horizontally disposed shaft, coupling means between the platform and the shaft facilitating vertical oscillation of the platform and horizontal movement of the same, means for effecting the vertical oscillation of the platform, spreader means operating against opposite sides of said belt for separating said sides simultaneously with the vertical oscillation of the platform, said spreader means being operated by the first-mentioned means, an oscillatable throw unit mounted upon a pivot disposed perpendicularly to the oscillation pivot for the platform, means connected with the platform for engaging and oscillating said throw means upon the vertical oscillation of the platform whereby a lateral thrust will be imparted to the platform to effect its horizontal movement and corresponding horizontal movement of the cone pulley with respect to said belt, and means for designating at a remote point the groove of the cone pulley engaged by the belt, comprising a slide member having upon one face characters corresponding in number to the number of grooves upon the cone pulley, a cover for said slide having a window through which a selected one of the characters may be exposed, and a flexible connection between said slide and the shiftable power unit supporting platform whereby movement of the platform will be imparted to said slide.

12. Mechanism for shifting a belt with respect to a grooved cone pulley with which it is operatively connected, comprising an oscillatable support for a driving unit for the pulley, whereby said unit may be shifted in a vertical plane, means facilitating the movement of said support transversely of said plane, means connected with said support facilitating the shifting of the same in the vertical plane from a remote point, a latching member oscillatably supported adjacent to said unit support, means for establishing connection between said latching member and said support at a plurality of points on the latching member, each of said points of connection between the latch member and the support corresponding with a position of engagement between the belt and the pulley, a rock member disposed adjacent the support for turning movement upon an axis perpendicular to the axis of oscillation of the support, an arm carried by the support for engagement with the rock member when said support is oscillated vertically whereby said rock member will be oscillated and will impart lateral shifting movement to the support, said latching member upon said lateral movement of the support having its point of connection with the support automatically changed, and means for spreading and holding the belt upon oscillation of the support to facilitate movement of the pulley with respect to the belt.

13. Mechanism of the character described for changing the engagement of a belt with a grooved cone pulley, comprising a supporting frame including a horizontal bar, a platform having a sleeve encircling said bar whereby the platform may oscillate vertically and shift laterally, a power unit supported upon the platform, a cone pulley connected with and driven by the power unit for connection with a power transmitting belt, a rock arm supported by the frame, spring means connecting the rock arm with the frame, a second rock arm coupled with the first arm for coaxial oscillation therewith, a flexible suspension unit having one end connected with a second rock arm and having the other end connected with the platform at a point remote from said sleeve, means operable from a remote point for raising and lowering said suspension unit whereby simultaneous raising and lowering movement will be given the platform and the second rock arm, means connected with said rock arms which is so constructed and arranged that upon oscillation of the arms for the raising of the platform, the said pulley engaged belt will be engaged and held stationary with its sides separated, and mechanism which is so constructed and arranged that upon raising movement of the platform a lateral thrust will be imparted thereto for shifting the same together with the power unit and pulley transversely with respect to the belt whereby upon lowering the platform said pulley will have a new point of engagement with the belt.

14. Mechanism of the character described for changing the engagement of a belt with a grooved cone pulley, comprising a supporting frame including a horizontal bar, a platform having a sleeve encircling said bar whereby the platform may oscillate vertically and shift laterally, a power unit supported upon the platform, a cone pulley connected with and driven by the power unit for connection with a power transmitting belt, a rock arm supported by the frame, spring means connecting the rock arm with the frame, a second rock arm coupled with the first arm for coaxial oscillation therewith, a flexible suspension unit having one end connected with a second rock arm and having the other end connected with the platform at a point remote from said sleeve, means operable from a remote point for raising and lowering said suspension unit whereby simultaneous raising and lowering movement will be given the platform and the second rock arm, means connected with said rock arms which is so constructed and arranged that upon oscillation of the arms for the raising of the platform, the said pulley engaged belt will be engaged and held stationary with its sides separated, and mechanism which is so constructed and arranged that upon raising movement of the platform a lateral thrust will be imparted thereto for shifting the same together with the power unit and pulley transversely with respect to the belt whereby upon lowering the platform said pulley will have a new point of engagement with the belt, the said platform being held in normal working position by the said spring connection between the first arm and the frame and the connection of said belt between the pulley and a driven member and thereby serving as a tightening means for the belt.

MORTON F. PHELPS.